US 6,692,395 B2

(12) United States Patent
Rodeghiero et al.

(10) Patent No.: US 6,692,395 B2
(45) Date of Patent: Feb. 17, 2004

(54) TRANSMISSON FOR POWER TAKE-OFF

(75) Inventors: Reno Antonio Rodeghiero, Hudson, IA (US); Werner Stettler, Cedar Falls, IA (US); Graham Thompson, Waterloo, IA (US); Barbara Klabunde, Waterloo, IA (US); Andrey Valeryevich Skotnikov, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/082,390

(22) Filed: Feb. 25, 2002

(65) Prior Publication Data

US 2003/0162619 A1 Aug. 28, 2003

(51) Int. Cl.⁷ .................................................. F16H 3/72
(52) U.S. Cl. ............................ 475/77; 475/76; 475/72; 74/15.4
(58) Field of Search .............................. 475/1, 2, 5, 72, 475/76, 77; 74/15.4, 15.63, 15.84

(56) References Cited

U.S. PATENT DOCUMENTS

| | | | |
|---|---|---|---|
| 4,191,270 A | 3/1980 | Monteith | 180/53 D |
| 4,774,855 A | * 10/1988 | Murrell et al. | 475/31 |
| 4,973,295 A | * 11/1990 | Lee | 475/153 |
| RE34,023 E | 8/1992 | Weis et al. | 74/15.86 |
| 5,211,064 A | 5/1993 | Betz et al. | 74/15.8 |
| 5,562,173 A | 10/1996 | Olson | 180/53.4 |
| 5,669,842 A | 9/1997 | Schmidt | 475/5 |
| 5,679,085 A | 10/1997 | Fredriksen et al. | 475/76 |
| 5,682,315 A | * 10/1997 | Coutant et al. | 701/57 |
| 5,765,650 A | 6/1998 | Checkel | 172/681 |
| 5,988,004 A | 11/1999 | Hauser | 74/15.63 |
| 6,052,978 A | * 4/2000 | Kempf | 56/119 |
| 6,105,353 A | * 8/2000 | Mohr et al. | 56/341 |
| 6,138,069 A | 10/2000 | Ellertson et al. | 701/50 |
| 6,145,455 A | 11/2000 | Gust et al. | 111/178 |

FOREIGN PATENT DOCUMENTS

| | | |
|---|---|---|
| DE | 40 24 063 A1 | 1/1992 |
| DE | 198 11 691 A1 | 9/1999 |
| EP | 1 072 817 A2 | 1/2001 |
| JP | 60196449 A * | 10/1985 |
| SU | 1142315 A | 2/1985 |
| WO | 94/07056 | 3/1994 |

\* cited by examiner

Primary Examiner—Ankur Parekh

(57) ABSTRACT

A PTO transmission includes a split power transmission unit having an output member connected to a PTO shaft, a first input connected to an engine output shaft and a second input connected the output of a variable speed drive unit. A control unit controls the speed of the variable speed drive unit as a function of sensed engine speed and maintains the PTO shaft at a constant speed. The split power transmission is preferably a planetary gear unit. The variable speed drive unit preferably includes a variable displacement hydrostatic pump driving a fixed displacement hydrostatic motor which drives a sun gear of the planetary gear unit. This system transmits power to the PTO shaft from both the engine and from the variable speed drive unit. The control unit may also control the variable speed drive unit so that the speed of the PTO shaft is maintained at a desired ratio with respect to the ground speed, or so that the speed of the PTO shaft is maintained at a speed set by an operator.

12 Claims, 2 Drawing Sheets

TRANSMISSON FOR POWER TAKE-OFF

BACKGROUND OF THE INVENTION

The present invention relates to a mechanism for transmitting power from an engine shaft to a power take-off (PTO) shaft.

When operating an agricultural tractor during light load conditions, it is common practice to "shift up and throttle back", in order to improve fuel economy and reduce noise. In modern tractors with electronic controls and power shift transmissions or infinitely variable transmissions, the shift up and throttle back operation is computer controlled to provide optimum performance and full efficiency. However, one cannot "throttle back" for optimum fuel economy when operating the PTO because most PTO driven implements require a constant drive shaft speed to insure proper operation.

A hybrid power transmission system is described in U.S. Pat. No. 5,669,842 wherein PTO shafts can be driven by the engine or by electric motor/generators. However, with this hybrid transmission system, when the clutch is disengaged, the PTO shafts can be driven by motor/generators independently of the engine. Because there is a direct connection between the engine and PTO shafts via the clutch and gears, whenever the clutch is engaged, the speed of the PTO drive shafts will vary as the engine speed varies, and cannot remain constant as the engine speed varies. It would be desirable to provide a mechanism wherein power can be transmitted from an engine to a PTO shaft and wherein the PTO shaft speed can be maintained constant regardless of variations in engine speed.

Some PTO-driven agricultural implements, have metering mechanisms, such as seed drills, planters, potato planters, fertilizer applicators, manure spreaders, and sprayers. Such implements require a PTO speed which is proportional to ground speed. If the tractor wheels slip, the ground speed will slow down, and if the PTO speed remains unchanged, the proportionality of the PTO speed to the ground speed will change, and the speed of the metering mechanism will increase relative to the ground speed. In the case of potato planting, such a condition can cause potatoes to be dumped onto the ground and unevenly planted.

SUMMARY

Accordingly, an object of this invention is to provide a transmission which maintains a constant PTO speed despite variations in engine speed.

Another object of this invention is to provide a transmission which is capable of maintaining PTO speed at a desired ratio with respect to ground speed.

These and other objects are achieved by the present invention, wherein a PTO transmission includes a split power transmission unit having an output connected to a PTO shaft, a first input connected to an engine output shaft and a second input connected the output of a variable ratio or speed drive unit. A control unit controls the speed of the variable speed drive unit as a function of sensed engine speed and to maintain the PTO shaft at a constant speed. The split power transmission is preferably a planetary gear unit. The variable speed drive unit preferably includes a variable displacement hydrostatic pump driving a fixed displacement hydrostatic motor which drives a sun gear of the planetary gear unit. This system transmits power to the PTO shaft from both the engine and from the variable speed drive unit.

Maintaining a constant PTO shaft speed allows PTO driven implements, such as a grass/hay spreader, to be run optimally. This system also increases fuel economy and, because it reduces engine speed, it reduces noise heard by the operator or others nearby. Also, if the driveline which drives the PTO shaft also drives a hydraulic pump, the hydraulic flow from the pump can be maintained even if the engine is running below its normal speed.

The control unit may also control the speed of the variable speed drive unit as a function of sensed ground speed, sensed output speed, an operator determined speed signal and/or an operator determined ground speed/PTO speed ratio, in order to maintain a desired operator set PTO speed or a desired operator set ground speed/PTO speed ratio. As a result, the PTO speed can be controlled to optimize implement performance without being effected by variations in tractor speed or engine speed.

DETAILED DESCRIPTION

Figure 1:
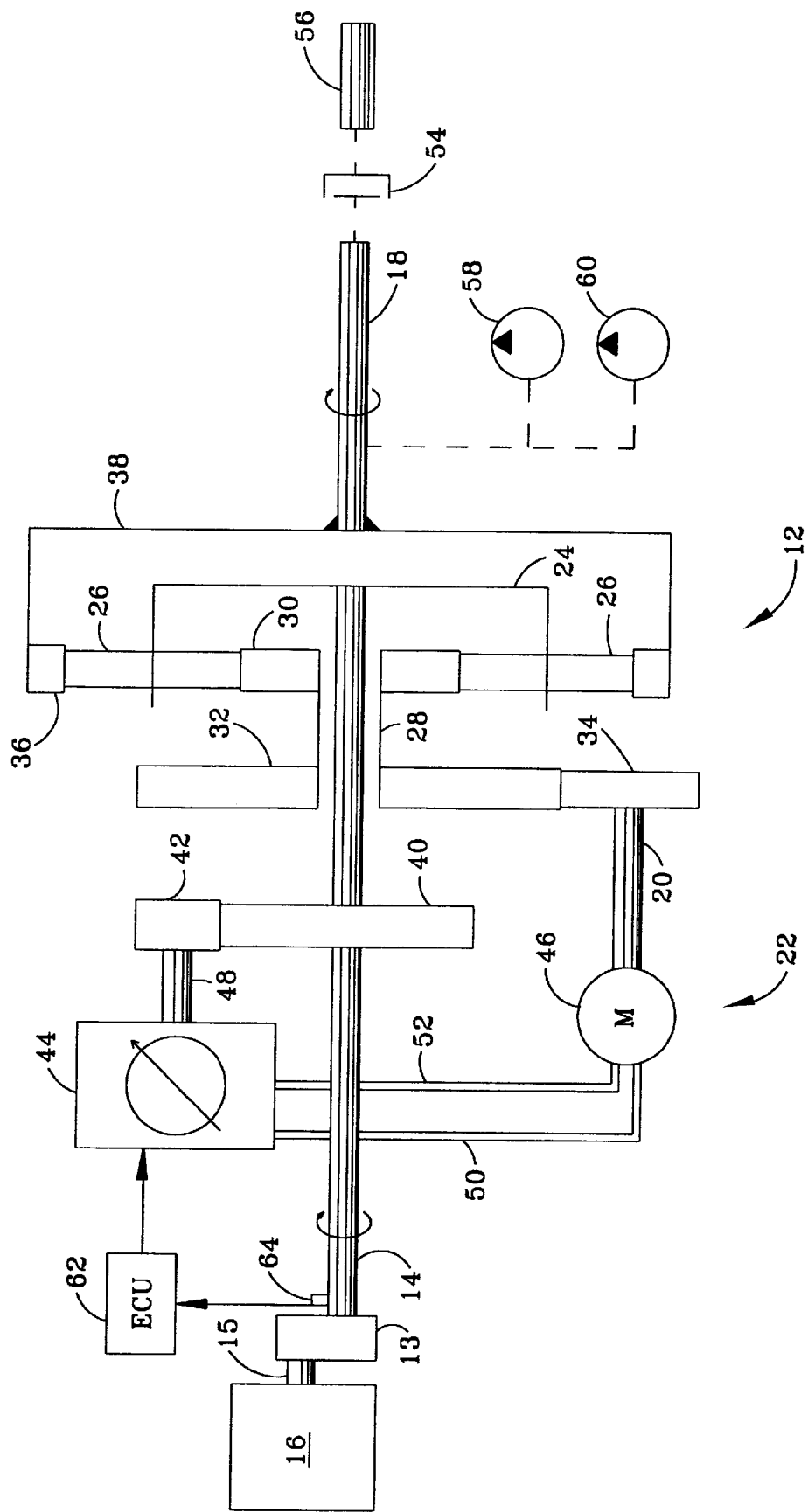
FIG. 1 is a simplified schematic diagram of a PTO transmission system according to the present invention.

Referring now to FIG. 1, a PTO transmission 10 includes a split power transmission or summing planetary unit 12 having a main input shaft 14 coupled through a conventional speed reduction gear unit 13 to an engine output shaft 15 of engine 16. The split power or summing unit 12 is also coupled to an output shaft 18, and to a variable speed unit 22 via an input shaft 20.

The split power or summing unit 12 includes a planet carrier 24 attached to an end of the shaft 14. Planet gears 26 are rotatably mounted on the planet carrier 24. A hollow sun shaft 28 rotatably mounted on and receives the shaft 14. A first smaller sun gear 30 is fixed on one end of the sun shaft 28, rotatable therewith and meshingly engages the planet gears 26. A second larger input sun gear 32 is fixed on the other end of the sun shaft 28, is rotatable therewith and meshingly engages an input gear 34. A ring gear 36 surrounds and meshingly engages the planet gears 26. A ring member 38 non-rotatably connects the ring gear 36 to output shaft 18. A larger drive gear 40 is non-rotatably mounted on shaft 14 between the engine 16 and sun shaft 28. A smaller drive gear 42 meshingly engages drive gear 40.

Variable speed unit 22 comprises an infinitely variable hydrostatic unit which includes a variable displacement hydraulic pump 44 and a fixed displacement hydraulic motor 46. Pump 44 is driven by drive gear 42 via drive shaft 48 and is connected to motor 46 by hydraulic lines 50 and 52. Motor 46 drives input shaft 20. The unit 22 can be an integral hydrostatic unit or separate pump and motor units connected by hydraulic lines.

The output shaft 18 is preferably connected to a PTO shaft 56 via a PTO clutch 54, and may also be drivingly connected to a hydraulic pump 58 for supplying hydraulic fluid to an implement hydraulic system (not shown) and to a hydraulic pump 60 for a tractor steering system (not shown).

Preferably, when the engine is running at a rated speed of 2200 rpm, the speed reduction gear unit 13 rotates the shaft 14 clockwise at 1000 rpm when viewed from the rear (from the right side of the Figure). In a preferred embodiment, the planet gears 26 have 39 teeth, sun gear 30 has 24 teeth, sun gear 32 has 88 teeth, input gear 34 has 22 teeth, ring gear 36 has 102 teeth, drive gear 40 has 60 teeth and drive gear 42 has 15 teeth. As a result, the pump 44 runs at a speed which is always a fixed multiple, four in this embodiment, times the speed of shaft 14.

A control unit 62 receives an engine speed signal from shaft speed sensor 64 and generates a control signal which is communicated to the pump 44 to control the displacement thereof. Preferably, the control unit 62 is adapted to control the displacement of the pump 44 so that the rotation speed of motor 46 varies linearly from −4000 rpm when the engine is running at rated speed to +2630 rpm when the engine speed is 1505 rpm. The speed of motor 46 passes through zero rpm as the engine speed passes through a speed of between 1793 and 1779 rpm. As a result, the rotation speed of ring gear 36 and output shaft 18 remains substantially at 1000 rpm as the engine speed varies from 2200 rpm to a lower speed of 1505 rpm, for example. Also, the hydraulic pumps 58 and 60 can also be run at a constant speed so that the hydraulic flow to an implement or other hydraulic components can be maintained even while the engine is running slower than normal.

Figure 2:
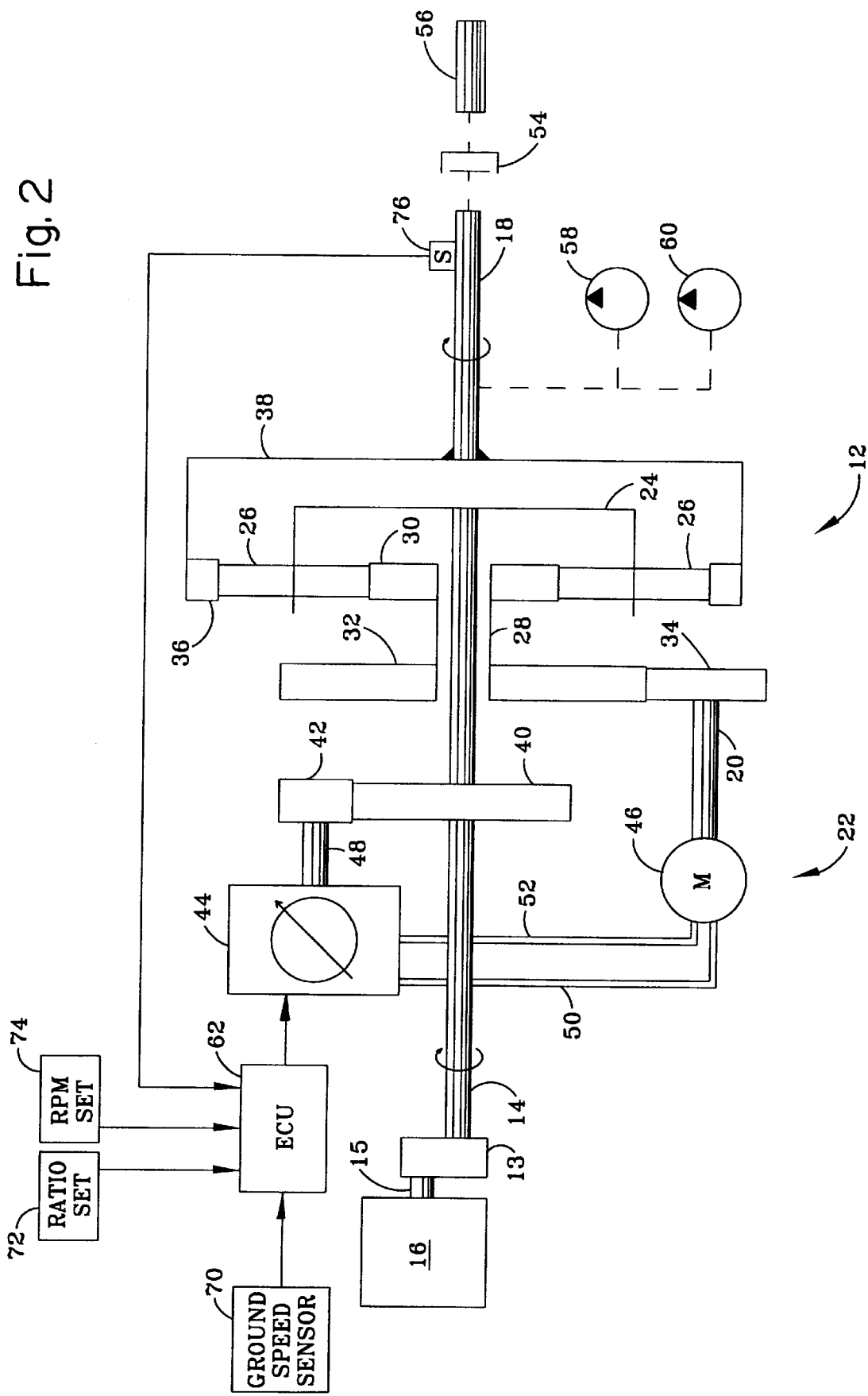
FIG. 2 is a simplified schematic diagram of an alternate embodiment of a PTO transmission system according to the present invention.

Referring now to FIG. 2, in the alternative embodiment shown therein, the ECU 62 receives a ground speed signal from a ground speed sensor 70, such as a conventional ground speed radar unit. The ECU 62 may also receive a ratio set signal from a ratio setting unit 72, such an operator controlled transducer placed in a vehicle operator's console (not shown), and may also receive a speed or rpm signal from an rpm setting device 74. The ECU 62 also receives an output shaft speed signal from an output shaft speed sensor 76. The ECU is preferably programmed to control the displacement of pump 44 so that the speed of output shaft 18 is maintained at a certain ratio with respect to the ground speed, the ratio being set by ratio setting unit 72. The ECU 62 may also be programmed to control the displacement of pump 44 so that the speed of output shaft 18 is maintained at a constant speed set by the speed setting unit 74 and using a feedback signal provided by speed sensor 76.

This is an efficient system because most of the power flows from the engine to the output shaft via the planetary gear unit 12 which has low frictional losses. Only a maximum of approximately 25% of the power will be transmitted through hydrostatic unit 22 which has higher losses.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A system for transmitting power from an engine shaft to a PTO shaft, comprising:
    a transmission having a first input member coupled to the engine shaft, a second input member and an output member coupled to the PTO shaft, the output member having a rotation speed which is a function of a rotation speed of the first and second input members;
    a variable speed drive unit connected to the second input member;
    a ground speed sensor generating a ground speed signal;
    an operator controlled ratio setting unit generating a ratio signal; and
    a control unit operatively coupled to the variable speed drive unit, the control unit receiving the ground speed signal and the ratio signal, and the control unit generating control signals which cause a rotation speed of the variable speed drive unit to vary so as to maintain a desired ratio between a ground speed and the rotation speed of the output member.

2. The system of claim 1, further comprising:
    a control unit operatively coupled to the variable speed drive unit, the control unit generating control signals which cause a rotation speed of the variable speed drive unit to vary so that the rotation speed of the output member remains substantially constant despite variations in the rotation speed of the engine shaft.

3. The system of claim 2, further comprising:
    a speed sensor sensing the rotation speed of the first input member and supplying a rotation speed signal to the control unit.

4. The system of claim 1, wherein the variable speed drive unit comprises:
    a hydraulic pump drivingly connected to the first input member; and
    a hydraulic motor driven by the pump and connected to the second input member of the transmission.

5. The system of claim 4, wherein
    the pump is a variable displacement hydraulic pump and the motor is a fixed displacement motor.

6. The system of claim 1, wherein the transmission comprises:
    a planet carrier fixed for rotation with the engine shaft;
    planet gears rotatably mounted on the planet carrier;
    a ring gear attached for rotation with the output member and in meshing engagement with the planet gears;
    a sun gear in meshing engagement with the planet gears and drivingly connected to the variable speed drive unit.

7. The system of claim 1, further comprising:
    an operator controlled speed setting unit generating a desired speed signal;
    an output member speed sensor generating an output member speed signal; and
    a control unit operatively coupled to the variable speed drive unit, the control unit receiving the desired speed signal and the output member speed signal, and the control unit generating control signals which cause a rotation speed of the variable speed drive unit to vary so as to maintain the rotation speed of the output member at a desire speed.

8. A system for transmitting power from an engine shaft to a PTO shaft, comprising:
    a planet carrier drivingly connected to the engine shaft;
    planet gears rotatably mounted on the planet carrier;
    a ring gear drivingly connected to the PTO shaft and in meshing engagement with the planet gears;
    a sun gear in meshing engagement with the planet gears;
    a variable speed drive mechanism for rotating the sun gear at a variable speeds;
    a ground speed sensor generating a ground speed signal;
    an operator controlled ratio setting unit generating a ratio signal; and
    a control unit operatively coupled to the variable speed drive unit, the control unit receiving the ground speed signal and the ratio signal, and the control unit generating control signals which cause a rotation speed of the variable speed drive mechanism to vary so as to maintain a desired ratio between a ground speed and the rotation speed of the ring gear.

9. The system of claim 8, wherein the variable speed drive mechanism comprises:

a speed sensor generating a planet carrier speed signal;

a control unit receiving the speed signal and generating a control signal as a function thereof; and a variable speed drive unit receiving the control signal and drivingly coupled to the sun gear, the control unit and the drive unit cooperating so that the PTO shaft rotates a constant speed despite variations in engine shaft speed.

10. The system of claim 8, wherein the drive mechanism comprises:

a variable speed drive motor having a motor drive shaft; and drive gear fixed for rotation with the motor drive shaft and in meshing engagement with the sun gear.

11. The system of claim 8, wherein the drive mechanism comprises:

a first drive gear fixed for rotation with the planet carrier;

a variable displacement pump having an input shaft driven by the first drive gear;

a fixed displacement variable speed hydraulic motor hydraulically driven by the pump and having a variable speed motor drive shaft; and a second drive gear in meshing engagement with the sun gear and fixed for rotation with the motor drive shaft.

12. A system for transmitting power from an engine shaft to a PTO shaft, comprising:

a planet carrier drivingly connected to the engine shaft;

planet gears rotatably mounted on the planet carrier;

a ring gear drivingly connected to the PTO shaft and in meshing engagement with the planet gears;

a sun gear in meshing engagement with the planet gears;

a variable speed drive mechanism for rotating the sun gear at a variable speed;

an operator controlled speed setting unit generating a desired speed signal;

an output member coupled between the ring gear and the PTO shaft;

an output member speed sensor generating an output member speed signal; and a control unit operatively coupled to the variable speed drive unit, the control unit receiving the desired speed signal and the output member speed signal, and the control unit generating control signals which cause a rotation speed of the variable speed drive mechanism to vary so as to maintain the rotation speed of the output member at a desired speed.

* * * * *